(12) United States Patent
Yoshikawa et al.

(10) Patent No.: US 7,116,529 B2
(45) Date of Patent: Oct. 3, 2006

(54) MAGNETORESISTIVE ELEMENT IN WHICH PINNED MAGNETIZATION LAYERS HAVE ANTIPARALLEL PINNED DIRECTIONS, MAGNETIC HEAD AND MAGNETIC RECORDING/REPRODUCING APPARATUS

(75) Inventors: Masatoshi Yoshikawa, Yokohama (JP); Masayuki Takagishi, Kawasaki (JP); Masashi Sahashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 404 days.

(21) Appl. No.: 10/654,988

(22) Filed: Sep. 5, 2003

(65) Prior Publication Data
    US 2004/0114280 A1    Jun. 17, 2004

(30) Foreign Application Priority Data
    Sep. 6, 2002    (JP)    ............................. 2002-261774

(51) Int. Cl.
    *G11B 5/39*    (2006.01)
(52) U.S. Cl. ................................... 360/324.1
(58) Field of Classification Search ... 360/324.1–324.2
    See application file for complete search history.

(56) References Cited

U.S. PATENT DOCUMENTS

| 5,206,590 | A | 4/1993 | Dieny et al. |
| 5,701,222 | A | 12/1997 | Gill et al. |
| 6,175,476 | B1 * | 1/2001 | Huai et al. ............. 360/324.11 |
| 6,185,079 | B1 * | 2/2001 | Gill ......................... 360/324.2 |
| 6,185,080 | B1 * | 2/2001 | Gill ......................... 360/324.2 |
| 6,633,461 | B1 * | 10/2003 | Gill ............................. 360/314 |

FOREIGN PATENT DOCUMENTS

| JP | 2002-157711 | 5/2002 |
| JP | 2002-163807 | 6/2002 |
| JP | 2003-218429 | 7/2003 |

* cited by examiner

*Primary Examiner*—A. J. Heinz
(74) *Attorney, Agent, or Firm*—Oblon, Spivak, McClelland, Maier & Neustadt, P.C.

(57) ABSTRACT

A magnetoresistive element has a magnetoresistive film and a pair of electrodes adapted to flow a sense current in a direction substantially perpendicular to a plane of the magnetoresistive film. The magnetoresistive film includes first and second magnetization free layers and first to fourth magnetization pinned layers with nonmagnetic intermediate layers interposed therebetween. The second magnetization pinned layer and the third magnetization pinned layer are formed between the second nonmagnetic intermediate layer and the third nonmagnetic intermediate layer. The directions of magnetization of the first and second magnetization pinned layers are substantially parallel to each other. The directions of magnetization of the third and fourth magnetization pinned layers are substantially parallel to each other. Further, the direction of magnetization of the second magnetization pinned layer is substantially antiparallel to the direction of magnetization of the third magnetization pinned layer.

17 Claims, 7 Drawing Sheets

MAGNETORESISTIVE ELEMENT IN WHICH PINNED MAGNETIZATION LAYERS HAVE ANTIPARALLEL PINNED DIRECTIONS, MAGNETIC HEAD AND MAGNETIC RECORDING/REPRODUCING APPARATUS

CROSS-REFERENCE TO RELATED APPLICATIONS

This application is based upon and claims the benefit of priority from the prior Japanese Patent Application No. 2002-261774, filed Sep. 6, 2002, the entire contents of which are incorporated herein by reference.

BACKGROUND OF THE INVENTION

1. Field of the Invention

The present invention relates to a magnetoresistive element, a magnetic head and a magnetic recording/reproducing apparatus, more particularly, a magnetoresistive element constructed such that a sense current is made to flow in a direction perpendicular to a plane of the magnetoresistive film as well as to a magnetic head and a magnetic recording/reproducing apparatus using the particular magnetoresistive element.

2. Description of the Related Art

In recent years, recording density is rapidly increased in a magnetic recording/reproducing apparatus such as an HDD (Hard Disk Drive). Accordingly, a magnetic head is also required to be adapted for the high recording density.

With increase in the recording density, the size of a recording bit recorded in a recording medium is diminished, and a signal magnetic field is lowered. In a conventional ring core type inductive magnetic head, the signal magnetic field generated from the recording medium is detected via the ring core by the electromagnetic induction effect. Since the signal magnetic field is detected indirectly via the ring core, it is difficult to ensure sufficient detection sensitivity.

On the other hand, a magnetoresistive head is proposed in recent years, in which the medium signal magnetic field is detected directly by utilizing magnetoresistance. The magnetoresistive head is advantageous in that the medium signal magnetic field can be detected directly by a field-sensing portion formed in the vicinity of the medium surface, which makes it possible to achieve high sensitivity.

The magnetic head used mainly nowadays includes a spin-valve type magnetoresistive element that generates giant magnetoresistance. The spin-valve type magnetoresistive film has a stacked structure of a magnetization pinned layer (pinned layer), an intermediate layer (spacer layer) and a magnetization free layer (free layer), and exhibits giant magnetoresistance that is at least two times as much as that produced by the conventional magnetoresistive film.

A so-called CIP (Current-In-Plane) structure for a magnetoresistive film is known, in which a sense current is made to flow in an in-plane direction of the magnetoresistive film using a pair of electrodes. In the magnetic head using the particular magnetoresistive film described above, a shield type construction is employed, in which a spin-valve type magnetoresistive film is sandwiched between a pair of magnetic shields each formed of a ferromagnetic material with insulator layers interposed between them.

On the other hand, a so-called CPP (Current-Perpendicular-to-Plane) type magnetic head is proposed in recent years, in which a sense current is made to flow using a pair of electrodes in a direction perpendicular to a plane of the spin-valve film. In general, the CPP type magnetic head permits improved magnetoresistance (MR) ratio, compared with the CIP type magnetic head and, thus, a higher head output can be expected for the CPP type magnetic head. In addition, the insulating layers between the MR film and the shields can be omitted in the CCP type magnetic head so as to make it possible to decrease a distance between the shields, i.e., a magnetic gap.

Now, in a longitudinal magnetic recording system, recording density is approaching its limit because of thermal fluctuation. Such being the situation, a perpendicular magnetic recording system that is tolerant of thermal fluctuation is expected to be a promising system. Thus, systems of various combinations of perpendicular recording media and shield type magnetic heads are proposed.

For example, U.S. Pat. No. 5,206,590 discloses a system in which a shield type magnetic head is applied to a perpendicular recording medium. The magnetic head disclosed in this patent is a so-called "shield type single spin-valve magnetic head" in which a single magnetoresistive film is arranged between a pair of magnetic shields. The magnetoresistive film has a stacked structure of an antiferromagnetic layer, a magnetization pinned layer (pinned layer), a nonmagnetic intermediate layer (spacer layer), and a magnetization free layer (free layer).

When magnetization of a perpendicular recording medium is detected by using the shield type single spin-valve magnetic head referred to above, a resultant output waveform is monotonously changed with respect to signal magnetization from recording bits on the recording medium, as shown in FIG. 16. Therefore, in order to obtain an output waveform as in the ordinary longitudinal magnetic recording system in which a peak appears in accordance with passage of the magnetic head over a magnetization transition, it is necessary to add a differential circuit to a readout signal processing circuit. However, the differential circuit gives rise to a problem of increased noise. In addition, the shape of the peak after the differential treatment tends to be shifted so as to give rise to a problem of increased signal error rate and another problem of a deteriorated signal-to-noise ratio. Also, as is known to the art, in order to allow the MR head of the particular shield type to be adapted to improved recording density, it is important to diminish the gap between the paired magnetic shields. In the case of the magnetic head, however, magnetoresistive film includes a thick antiferromagnetic layer so as to make it difficult to diminish the gap between the paired magnetic shields.

Likewise, a shield type dual spin-valve magnetic head in which two magnetoresistive films are formed between a pair of magnetic shields (disclosed in, for example, U.S. Pat. No. 5,705,222) has the same problems pointed out above.

BRIEF SUMMARY OF THE INVENTION

An object of the present invention is to provide a magnetoresistive element of a high sensitivity, which exhibits higher detection sensitivity, i.e., a high flux efficiency and a high MR ratio, than that exhibited by the conventional shield type magnetic head, and is capable of coping with the requirement for a higher magnetic recording density in the future, as well as a magnetic head and a magnetic recording/reproducing apparatus each including the particular magnetoresistive element.

A magnetoresistive element according to an aspect of the present invention comprises: a magnetoresistive film; and a pair of electrodes electrically connected to upper and lower surfaces of the magnetoresistive film, respectively, so as to flow a sense current in a direction substantially perpendicular to a plane of the magnetoresistive film, in which the magnetoresistive film comprises: a first magnetization free layer of a ferromagnetic film whose magnetization direction is changed in response to the external magnetic field, a second magnetization free layer of a ferromagnetic film whose magnetization direction is changed in response to the external magnetic field, a first magnetization pinned layer of a ferromagnetic film whose magnetization direction is substantially pinned in one direction, a second magnetization pinned layer of a ferromagnetic film whose magnetization direction is substantially pinned in one direction, a third magnetization pinned layer of a ferromagnetic film whose magnetization direction is substantially pinned in one direction, a fourth magnetization pinned layer of a ferromagnetic film whose magnetization direction is substantially pinned in one direction, a first nonmagnetic intermediate layer formed between the first magnetization free layer and the first magnetization pinned layer, a second nonmagnetic intermediate layer formed between the first magnetization free layer and the second magnetization pinned layer, a third nonmagnetic intermediate layer formed between the second magnetization free layer and the third magnetization pinned layer, and a fourth nonmagnetic intermediate layer formed between the second magnetization free layer and the fourth magnetization pinned layer, the second magnetization pinned layer and the third magnetization pinned layer being formed between the second nonmagnetic intermediate layer and the third nonmagnetic intermediate layer; the pinned direction of magnetization of the first magnetization pinned layer is substantially parallel to the pinned direction of magnetization of the second magnetization pinned layer, the pinned direction of magnetization of the third magnetization pinned layer is substantially parallel to the pinned direction of magnetization of the fourth magnetization pinned layer, and the pinned direction of magnetization of the second magnetization pinned layer is substantially antiparallel to the pinned direction of magnetization of the third magnetization pinned layer.

A magnetoresistive element according to another aspect of the present invention comprises a magnetoresistive film, and a pair of electrodes electrically connected to upper and lower surfaces of the magnetoresistive film, respectively, so as to flow a sense current in a direction substantially perpendicular to a plane of the magnetoresistive film, in which the magnetoresistive film comprises: a first magnetization free layer of a ferromagnetic film whose magnetization direction is changed in response to the external magnetic field, a second magnetization free layer of a ferromagnetic film whose magnetization direction is changed in response to the external magnetic field, a first magnetization pinned layer of a ferromagnetic film whose magnetization direction is substantially pinned in one direction, a second magnetization pinned layer of a ferromagnetic film whose magnetization direction is substantially pinned in one direction, a first nonmagnetic intermediate layer formed between the first magnetization free layer and the first magnetization pinned layer, and a second nonmagnetic intermediate layer formed between the second magnetization free layer and the second magnetization pinned layer, the first magnetization pinned layer and the second magnetization pinned layer being formed between the first nonmagnetic intermediate layer and the second nonmagnetic intermediate layer; the pinned direction of magnetization of the first magnetization pinned layer is substantially antiparallel to the pinned direction of magnetization of the second magnetization pinned layer, and the magnetization of each of the first magnetization pinned layer and the second magnetization pinned layer is pinned by exchange coupling with one antiferromagnetic layer.

A magnetic head according to another aspect of the present invention comprises the magnetoresistive element defined above.

A magnetic recording/reproducing apparatus according to still another aspect of the present invention comprises the magnetic head defined above and a perpendicular magnetic recording medium.

DETAILED DESCRIPTION OF THE INVENTION

Embodiments of the present invention will now be described with reference to the accompanying drawings.

A magnetoresistive element according to a first embodiment of the present invention will be described first. The magnetoresistive element in this embodiment comprises a magnetoresistive film and a pair of electrodes electrically connected to upper and lower surfaces of the magnetoresistive film, respectively, so as to flow a sense current in a direction substantially perpendicular to a plane of the magnetoresistive film, in sensing operation. The magnetoresistive film includes first and second magnetization free layers, first to fourth magnetization pinned layers, a first nonmagnetic intermediate layer formed between the first magnetization free layer and the first magnetization pinned layer, a second nonmagnetic intermediate layer formed between the first magnetization free layer and the second magnetization pinned layer, a third nonmagnetic intermediate layer formed between the second magnetization free layer and the third magnetization pinned layer, and a fourth nonmagnetic intermediate layer formed between the second magnetization free layer and the fourth magnetization pinned layer. Further, the second magnetization pinned layer and the third magnetization pinned layer are formed between the second nonmagnetic intermediate layer and the third nonmagnetic intermediate layer.

Figure 1:
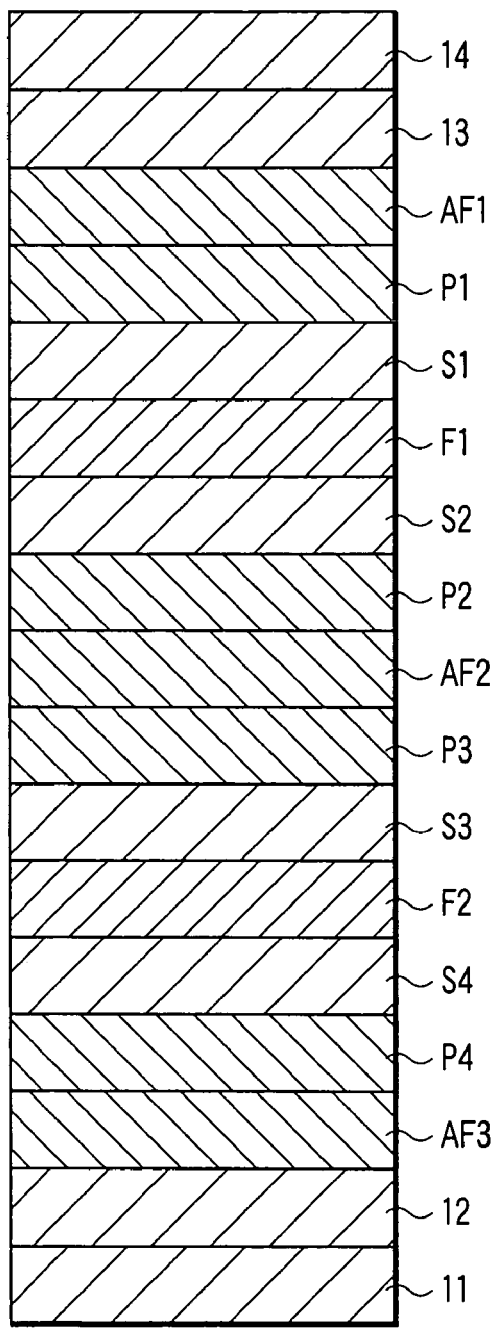
FIG. 1 schematically shows a construction of a magnetoresistive element according to a first embodiment of the present invention.
Figure 2:
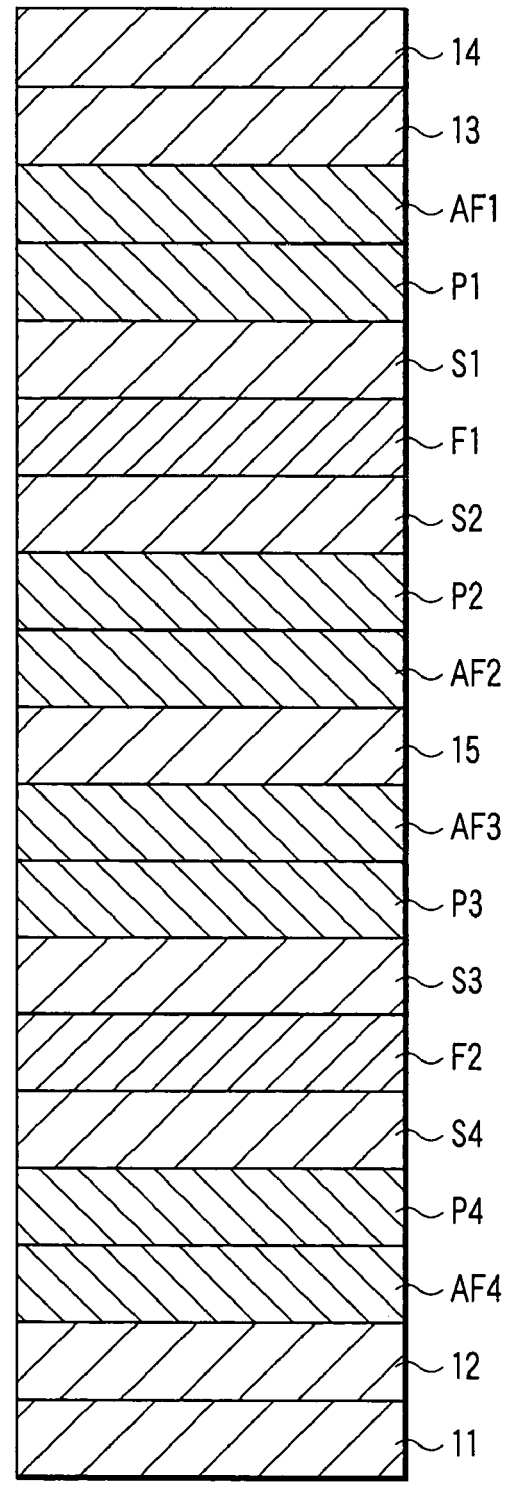
FIG. 2 schematically shows another construction of a magnetoresistive element according to the first embodiment of the present invention.

Each of FIGS. 1 and 2 schematically exemplifies the construction of the magnetoresistive element (CPP-GMR film) according to the first embodiment of the present invention.

The magnetoresistive element shown in FIG. 1 includes the lower electrode 11, the underlayer 12, the third antiferromagnetic layer AF3, the fourth magnetization pinned layer (fourth pinned layer) P4, the fourth nonmagnetic intermediate layer (fourth spacer layer) S4, the second magnetization free layer (second free layer) F2, the third nonmagnetic intermediate layer (third spacer layer) S3, the third magnetization pinned layer (third pinned layer) P3, the second antiferromagnetic layer AF2, the second magnetization pinned layer (second pinned layer) P2, the second nonmagnetic intermediate layer (second spacer layer) S2, the first magnetization free layer (first free layer) F1, the first nonmagnetic intermediate layer (first spacer layer) S1, the first magnetization pinned layer (first pinned layer) P1, the first antiferromagnetic layer AF1, the protective layer 13, and the upper electrode 14, which are stacked one upon the other in the order mentioned.

The magnetoresistive element shown in FIG. 2, which is a modification of the magnetoresistive element shown in FIG. 1, includes the lower electrode 11, the underlayer 12, the fourth antiferromagnetic layer AF4, the fourth magnetization pinned layer (fourth pinned layer) P4, the fourth nonmagnetic intermediate layer (fourth spacer layer) S4, the second magnetization free layer (second free layer) F2, the third nonmagnetic intermediate layer (third spacer layer) S3, the third magnetization pinned layer (third pinned layer) P3, the third antiferromagnetic layer AF3, the center layer 15, the second antiferromagnetic layer AF2, the second magnetization pinned layer (second pinned layer) P2, the second nonmagnetic intermediate layer (second spacer layer) S2, the first magnetization free layer (first free layer) F1, the first nonmagnetic intermediate layer (first spacer layer) S1, the first magnetization pinned layer (first pinned layer) P1, the first antiferromagnetic layer AF1, the protective layer 13 and the upper electrode 14, which are stacked one upon the other in the order mentioned. The magnetoresistive element shown in FIG. 2 differs from the magnetoresistive element shown in FIG. 1 in that, the antiferromagnetic layer AF3, the center layer 15 and the antiferromagnetic layer AF2 are formed between the third pinned layer P3 and the second pinned layer P2.

A pair of electrodes 11 and 14 formed on the lower and upper surfaces of the magnetoresistive element permits a sense current to flow in a direction substantially perpendicular to a plane of the magnetoresistive element.

In the magnetoresistive element according to the first embodiment of the present invention, a magnetic gap is substantially defined by the thin films sandwiched between the first magnetization free layer (first free layer) F1 and the second magnetization free layer (second free layer) F2 so as to make it possible to provide a magnetic gap smaller than that formed in a conventional shield type magnetic head, which enables to cope with ultra-high recording density. Therefore, in the magnetoresistive element according to the first embodiment of the present invention, it is unnecessary to arrange a pair of magnetic shields for defining a magnetic gap. It is certainly possible to arrange the magnetic shields. Even in this case, however, a substantial magnetic gap is formed between the first free layer F1 and the second free layer F2. Also, it is possible to allow the pair of electrodes 11 and 14 to perform the function of the magnetic shields.

In the magnetoresistive element according to the first embodiment of the present invention, the pinned direction of magnetization of the first magnetization pinned layer (first pinned layer) P1 is substantially parallel to the pinned direction of magnetization of the second magnetization pinned layer (second pinned layer) P2. Also, the pinned direction of magnetization of the third magnetization pinned layer (third pinned layer) P3 is substantially parallel to the pinned direction of magnetization of the fourth magnetization pinned layer (fourth pinned layer) P4. Further, the pinned direction of magnetization of the second magnetization pinned layer (second pinned layer) P2 is substantially antiparallel to the pinned direction of magnetization of the third magnetization pinned layer (third pinned layer) P3.

Where the pinned directions of magnetization of the first to fourth magnetization pinned layers are defined as described above, it is possible to perform differential operation by means of two terminals for signals read from a perpendicular magnetic recording medium. Also, since it is possible to obtain an output waveform in which a peak appears in accordance with a magnetization transition between recording bits, it is possible to use a conventional signal processing circuit for reproducing operation.

In order to define the pinned directions of magnetization of the first to fourth magnetization pinned layers as described above, the following design are applied, for example. In this case, the magnetization pinned layers are classified into two sets consisting of a first set of the first magnetization pinned layer and the second magnetization pinned layer and a second set of the third magnetization pinned layer and the fourth magnetization pinned layer, and each of the magnetization pinned layers for one set is formed of a single ferromagnetic layer or is formed of a stack of an odd number of ferromagnetic layers and nonmagnetic layers, and each of the magnetization pinned layers for the other set is formed of a stack of an even number of ferromagnetic layers and nonmagnetic layers.

The stack noted above, having a basic stacked structure of a ferromagnetic layer, a nonmagnetic layer and a ferromagnetic layer, is called a synthetic structure, which utilizes an antiferromagnetic coupling. The nonmagnetic layer is formed of, for example, ruthenium (Ru). The adjacent ferromagnetic layers are antiferromagnetically coupled with each other through the nonmagnetic layer (e.g., a Ru layer).

In order to pin the magnetization of the magnetization pinned layers in the synthetic structure, the structure is generally subjected to a heat treatment (a pinning heat treatment) with being applied with a magnetic field in one direction. In the synthetic structure of ferromagnetic layer/nonmagnetic layer/ferromagnetic layer, which constitutes the basic construction, it is possible to pin the directions of magnetization of the two adjacent ferromagnetic layers having a nonmagnetic layer sandwiched therebetween by a single pinning heat treatment.

Figure 3:
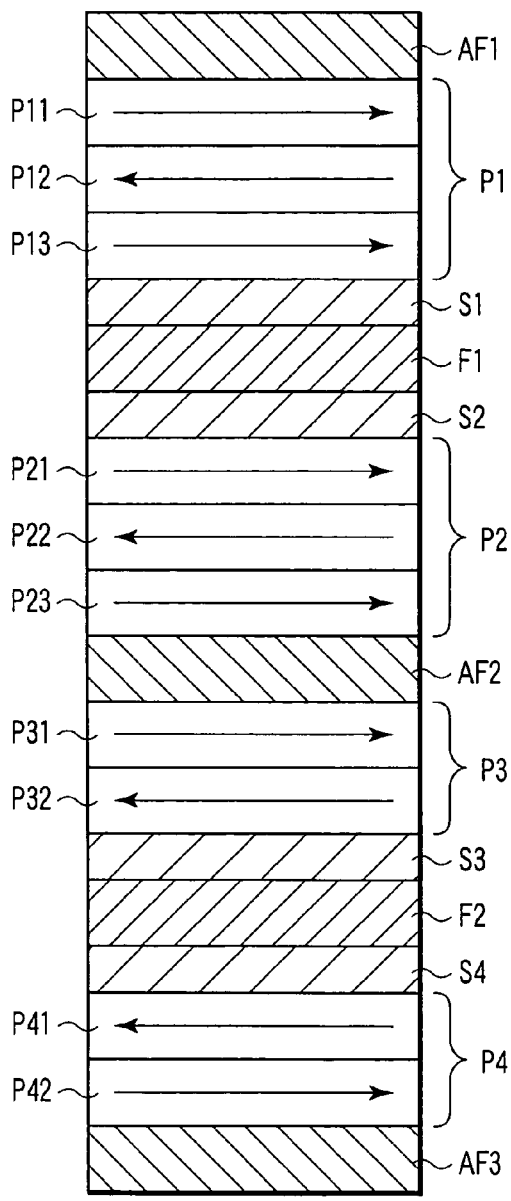
FIG. 3 schematically shows magnetization directions of the magnetization pinned layers included in a magnetoresistive element according to the first embodiment of the present invention.

FIG. 3 schematically shows the construction of a magnetoresistive element according to the first embodiment of the present invention, in which each of the first to fourth magnetization pinned layers has a synthetic structure. In the construction shown in FIG. 3, each of the first and second magnetization pinned layers P1 and P2 has a synthetic structure including three (odd number) ferromagnetic layers. On the other hand, each of the third and fourth magnetization pinned layers P3 and P4 has a synthetic structure including two (even number) ferromagnetic layers. Incidentally, the nonmagnetic layers sandwiched between the adjacent ferromagnetic layers constituting the magnetization pinned layer are omitted in the drawing for the sake of simplicity. Also, an arrow denotes the direction of magnetization of each of the ferromagnetic layers constituting the magnetization pinned layer.

To be more specific, the magnetoresistive element shown in FIG. 3 includes the third antiferromagnetic layer AF3, the fourth magnetization pinned layer (fourth pinned layer) P4 including two ferromagnetic layers P42 and P41, the fourth nonmagnetic intermediate layer (fourth spacer layer) S4, the second magnetization free layer (second free layer) F2, the third nonmagnetic intermediate layer (third spacer layer) S3, the third magnetization pinned layer (third pinned layer) P3 including two ferromagnetic layers P32 and P31, the second antiferromagnetic layer AF2, the second magnetization pinned layer (second pinned layer) P2 including three ferromagnetic layers P23, P22 and P21, the second nonmagnetic intermediate layer (second spacer layer) S2, the first nonmagnetic intermediate layer (first spacer layer) S1, the first magnetization pinned layer (first pinned layer) P1 including three ferromagnetic layers P13, P12 and P11, and the first antiferromagnetic layer AF1, which are stacked one upon the other in the order mentioned.

By designing the first to fourth magnetization pinned layers P1 to P4 to have a stacked structure (synthetic structure) as shown in FIG. 3, it is possible to set up a prescribed parallel or antiparallel alignment in the directions of magnetization of the ferromagnetic layers positioned closest to the nonmagnetic intermediate layer (spacer layer) among the ferromagnetic layers constituting the four magnetization pinned layers P1 to P4 by a single pinning heat treatment, i.e., by a pinning heat treatment in one direction. To be more specific, the pinned direction of magnetization of the ferromagnetic layer P13 is substantially parallel to the pinned direction of magnetization of the ferromagnetic layer P21. The pinned direction of magnetization of the ferromagnetic layer P32 is substantially parallel to the pinned direction of magnetization of the ferromagnetic layer P41. Further, the pinned direction of magnetization of the ferromagnetic layer P21 is substantially antiparallel to the pinned direction of magnetization of the ferromagnetic layer P32.

It should be noted that the magnetization of the ferromagnetic layer P11 included in the first magnetization pinned layer P1 is pinned by exchange coupling with the first antiferromagnetic layer AF1 that is the closest antiferromagnetic layer. Also, the magnetization of the ferromagnetic layer P23 included in the second magnetization pinned layer P2 and the magnetization of the ferromagnetic layer P31 included in the third magnetization pinned layer P3 are pinned by exchange coupling with the second antiferromagnetic layer AF2 that is the closest antiferromagnetic layer. Further, the magnetization of the ferromagnetic layer P42 included in the fourth magnetization pinned layer P4 is pinned by exchange coupling with the third antiferromagnetic layer AF3 that is the closest antiferromagnetic layer. What should be noted is that each magnetization of the ferromagnetic layers P11, P23, P31 and P42 is pinned in substantially one direction (toward right in FIG. 3). In other words, the directions of magnetization of these ferromagnetic layers are rendered parallel to each other.

Also, in the magnetoresistive element shown in FIG. 1 (or FIG. 3), the magnetization of the second magnetization pinned layer P2 (or the ferromagnetic layer P23) and the magnetization of the third magnetization pinned layer P3 (or the ferromagnetic layer P31) are pinned substantially in one direction by exchange coupling with the same second antiferromagnetic layer AF2. In this case, commonly used antiferromagnetic layer permits to omit one antiferromagnetic layer compared with the generally designed CPP type dual spin-valve structure. It follows that it is possible to decrease a parasitic resistance in the case of a CPP mode so as to improve an MR ratio. As a result, noise can be decreased in signal processing of the head output.

Further, it is desirable to make the second antiferromagnetic layer thinner than each of the first antiferromagnetic layer and the third antiferromagnetic layer. In this case, the distance between the two adjacent free layers can be shortened so as to improve resolution in the linear direction (i.e., in the bit string direction).

The principle of operation of the magnetoresistive element according to the first embodiment of the present invention will now be described with reference to FIGS. 4A, 4B, 5A, 5B, 6A, 6B and 7.

Figure 4A:
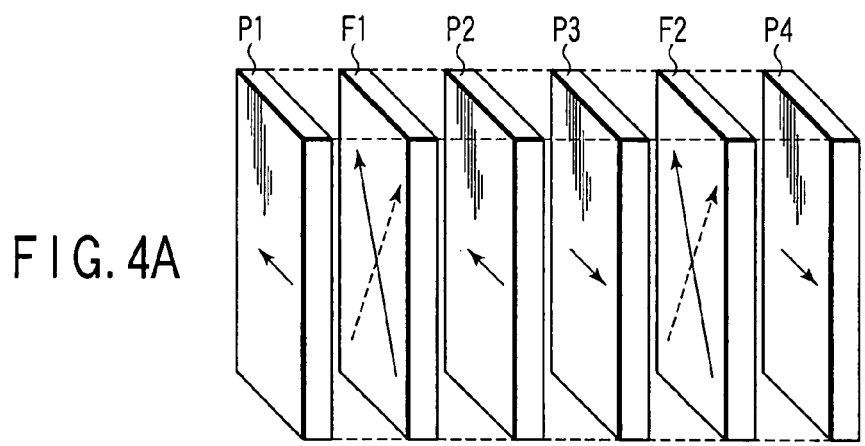
FIGS. 4A and 4B collectively illustrate operation performed by the magnetic head according to the first embodiment of the present invention for reading recording bits recorded in a perpendicular magnetic recording medium.
Figure 4B:
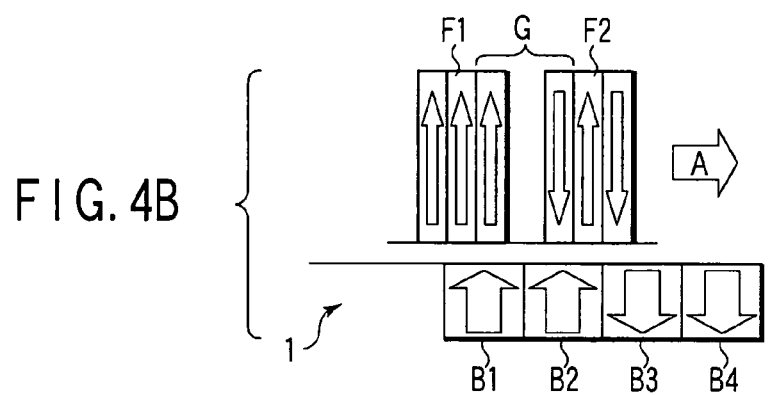
Figure 5A:
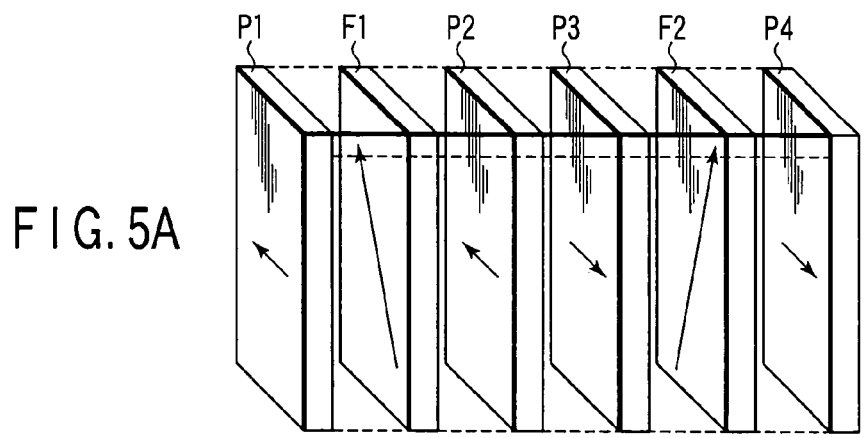
FIGS. 5A and 5B collectively illustrate operation performed by the magnetic head according to the first embodiment of the present invention for reading recording bits recorded in a perpendicular magnetic recording medium.
Figure 5B:
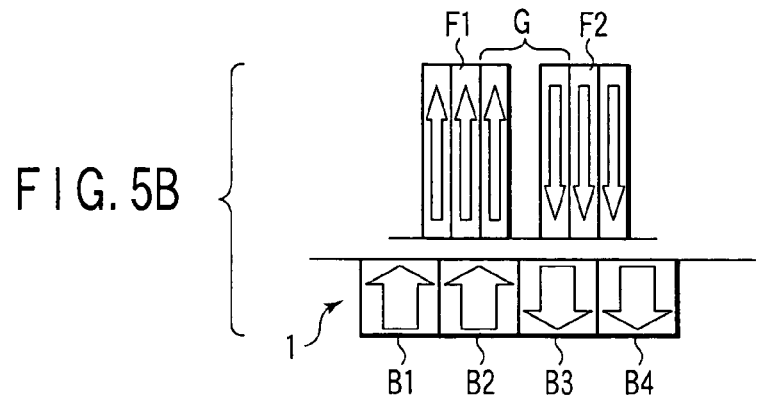
Figure 6A:
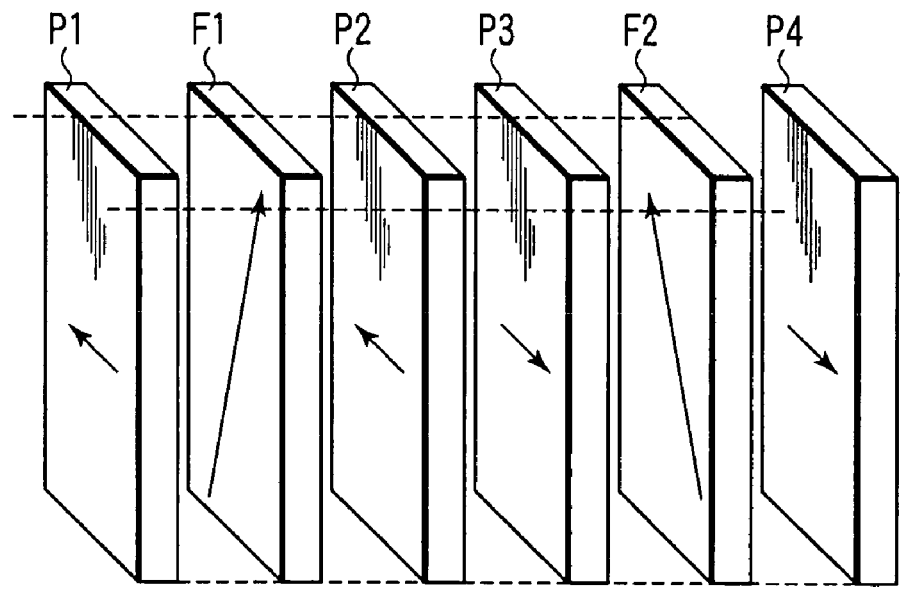
FIGS. 6A and 6B collectively illustrate operation performed by the magnetic head according to the first embodiment of the present invention for reading recording bits recorded in a perpendicular magnetic recording medium.
Figure 6B:
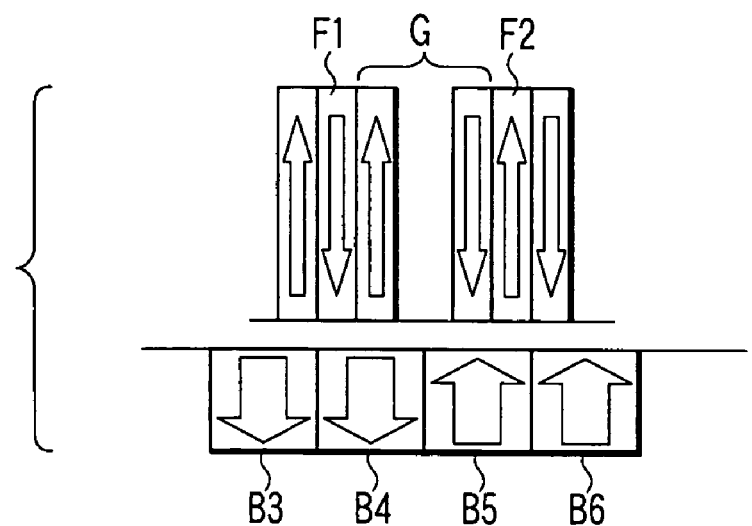

FIGS. 4A, 4B, 5A, 5B, 6A and 6B illustrate the operation performed by the magnetic head according to the first embodiment of the present invention for reading recording bits recorded in a perpendicular magnetic recording medium. FIGS. 4A, 5A and 6A are perspective views showing the directions of magnetization of the first to fourth pinned layers P1 to P4 and the first and second free layers F1 and F2. In these drawings, the front side corresponds to the air-bearing surface (ABS). The first pinned layer P1 and the second pinned layer P2 are magnetized upward. Also, the third pinned layer P3 and the fourth pinned layer P4 are magnetized downward. FIGS. 4B, 5B and 6B schematically show the state that the magnetic head is arranged over the perpendicular magnetic recording medium 1. These drawings show that the magnetic head is run relative to the perpendicular magnetic recording medium 1 in the direction denoted by the arrow A. Recording bits B1, B2, . . . are assumed to be formed in the perpendicular magnetic recording medium 1.

Figure 7:
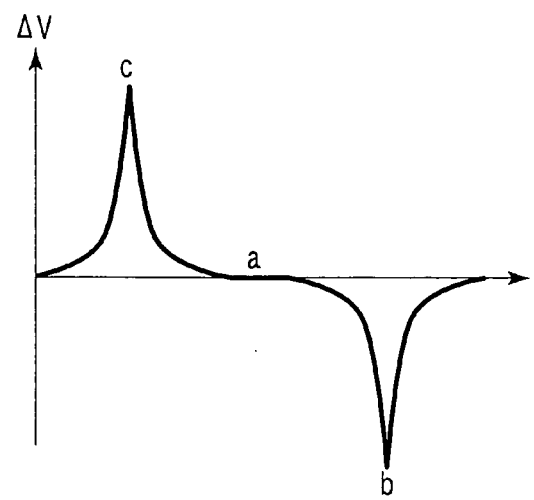
FIG. 7 shows a waveform of an output ($\Delta V = I \times \Delta \rho$) obtained by the magnetic head according to the first embodiment of the present invention.

FIG. 7 shows the waveform ($\Delta V = I \times \Delta \rho$) of the output from the magnetic head under the states shown in FIGS. 4 to 6.

In the magnetic head according to the first embodiment of the present invention, the two free layers F1 and F2 independently detect signals recorded in the magnetic recording medium 1. To be more specific, the first and second free layers F1 and F2 detect different magnetic fields of the magnetically recorded signals, i.e., the magnetic fields of the recorded bits.

FIGS. 4A and 4B show a moment when the boundary between the recording bits B1 and B2 each magnetized upward passes right under the gap portion G between the first free layer F1 and the second free layer F2. In this time, the directions of magnetization of the first and second free layers F1 and F2 are made to conform to the directions of magnetization of these recording bits. To be more specific, the directions of magnetization of these free layers are inclined within the film plane relative to the directions of magnetization of the first to fourth pinned layers P1 to P4, as shown in FIG. 4A. The two free layers F1 and F2 are magnetized in the same direction and substantially parallel to each other. If the boundary between the recording bits each magnetized downward passes through the region right under the gap portion G, the two free layers F1 and F2 are magnetized in the directions denoted by broken lines in FIG. 4A.

On the other hand, as shown in FIGS. 5A and 5B, when the magnetization transition between the upward magnetization in the recording bit B2 and the downward magnetization in the recording bit B3 passes under the gap portion G, the directions of magnetization of the first free layer F1 and the direction of magnetization of the second free layer F2 are changed in the film plane to incline in the opposite directions in response to the transition of magnetization.

Further, as shown in FIGS. 6A and 6B, when the magnetization transition between the downward magnetization in the recording bit B4 and the upward magnetization in the recording bit B5 passes right under the gap portion G, the directions of magnetization of the first free layer F1 and the second free layer F2 are changed to incline in the film plane in the opposite directions in response to the transition of magnetization.

In other words, when the direction of magnetization of the recording bit is changed right under the gap portions G, the directions of magnetization of the first and second free layers F1 and F2 are also inverted in response to the change in the direction of magnetization of the recording bits, with the result that a magnetic path is formed by the first and second free layers F1 and F2.

FIG. 7 shows the output under the states shown in FIGS. 4 to 6. When the magnetization transition between the recording bits does not pass right under the gap portion between the two free layers F1 and F2 as shown in FIG. 4, the output waveform becomes flat as denoted by "a" in FIG. 7. On the other hand, when the magnetization transition between the recording bits passes right under the gap portion between the two free layers F1 and F2 as shown in FIGS. 5 and 6, the output waveform shows peaks in response to the magnetization transitions as denoted by "b" and "c" in FIG. 7. To be more specific, an output waveform having a peak of one polarity when the magnetization of the recording bits is changed from "up" to "down" and another peak of the opposite polarity when the magnetization of the recording bits is changed from "down" to "up" is provided.

To reiterate, the pinned directions of magnetization of the first and second pinned layers are rendered substantially parallel to each other, the pinned directions of magnetization of the third and fourth pinned layers are also rendered substantially parallel to each other, and the pinned directions of magnetization of the second and third pinned layers are rendered substantially antiparallel to each other in the first embodiment of the present invention, as described above. As a result, if a sense current is supplied in the direction perpendicular to the plane of the magnetoresistive element, differential detection can be exerted. In general, three terminals are required for obtaining a differential output. In the magnetic head according to the first embodiment of the present invention, however, it is possible to obtain a differential output by using only two terminals of the electrodes on the upper and lower surfaces of the magnetoresistive film.

Incidentally, for obtaining a differential output by using three terminals in the magnetic head according to the first embodiment of the present invention, it is desirable to use, for example, the second antiferromagnetic layer AF2 (or the center layer 15 shown in FIG. 2) as one electrode of the third electrodes. In the differential detection by three terminals, it is possible for the pinned directions of magnetization of the second and third pinned layers to be substantially parallel to each other, not substantially antiparallel to each other. It should be noted, however, that, in the differential detection in the case where the pinned directions of magnetization of the second and third pinned layers are substantially parallel to each other, an electric circuit for realizing the particular function is provided. By employing the particular construction, it is possible to obtain the effect similar to that obtained by the two-terminal differential detection head described above.

The output waveform exemplified in FIG. 7 is similar to that obtained in the longitudinal magnetic recording system using the conventional magnetoresistive head. Therefore, according to the present invention, it is possible to detect the signal magnetization of the perpendicular magnetic recording medium without changing the circuit and the system of the readout signal processing section included in the conventional magnetic recording/reproducing system. As a result, it is possible to overcome the problem accompanying the addition of, for example, a differential circuit such as the decrease of the S/N ratio.

Also, since the differential operation is employed in the magnetic head according to the first embodiment of the present invention, it is possible to improve tolerance to thermal asperity that is generated by contact between the recording medium and the magnetic head. To be more specific, in the general shield type head, a problem of base line shift, i.e., the problem that the base line denoted by "a" in FIG. 7 fails to be rendered constant, and a problem of abnormal peaks other than those derived from medium signal magnetic field are caused. However, it is possible for the magnetic head according to the first embodiment of the present invention to avoid these problems.

Furthermore, in the magnetic head according to the first embodiment of the present invention, the detection resolution for the magnetization transitions between the recording bits is determined by the thickness of the gap portion G, which serves as a substantial magnetic gap, between two adjacent free layers. It should be noted in this connection, that, since a magnetic path is formed by the first and second free layers, the resolution in the direction of the linear recording density is rendered somewhat broader than the thickness of the gap portion G noted above. However, the thickness of the gap portion can be drastically decreased, compared with conventional shield type magnetic head, so as to make it possible to realize an ultra-high density recording system.

A magnetoresistive element according to a second embodiment of the present invention will now be described. The magnetoresistive element in this embodiment comprises a magnetoresistive film and a pair of electrodes electrically connected to upper and lower surfaces of the magnetoresistive film, respectively, so as to flow a sense current in a direction substantially perpendicular to a plane of the magnetoresistive film. The magnetoresistive film includes first and second magnetization free layers, first and second magnetization pinned layers, a first nonmagnetic intermediate layer formed between the first magnetization free layer and the first magnetization pinned layer, and a second nonmagnetic intermediate layer formed between the second magnetization free layer and the second magnetization pinned layer. The first magnetization pinned layer and the second magnetization pinned layer are formed between the first nonmagnetic intermediate layer and the second nonmagnetic intermediate layer. Further, the magnetization of each of the first magnetization pinned layer and the second magnetization pinned layer is pinned by exchange coupling with one antiferromagnetic layer.

Figure 8:
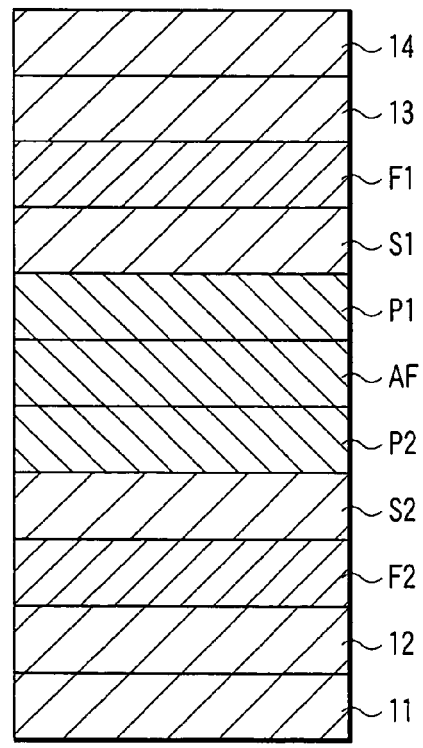
FIG. 8 schematically shows a construction of a magnetoresistive element according to a second embodiment of the present invention.

FIG. 8 schematically exemplifies the construction of the magnetoresistive element according to the second embodiment of the present invention. The magnetoresistive element shown in FIG. 8 includes the lower electrode 11, the underlayer 12, the second magnetization free layer (second free layer) F2, the second nonmagnetic intermediate layer (second spacer layer) S2, the second magnetization pinned layer (second pinned layer) P2, the antiferromagnetic layer AF, the first magnetization pinned layer (first pinned layer) P1, the first nonmagnetic intermediate layer (first spacer layer) S1, the first magnetization free layer (first free layer) F1, the protective layer 13, and the upper electrode 15, which are stacked one upon the other in the order mentioned.

The magnetoresistive element shown in FIG. 8 is equivalent in construction to the magnetoresistive element shown in FIG. 1 from which the first antiferromagnetic layer, the first magnetization pinned layer and the first nonmagnetic intermediate layer which are formed between the protective layer and the first magnetization free layer, and the fourth nonmagnetic intermediate layer, the fourth magnetization pinned layer and the third antiferromagnetic layer which are formed between the second magnetization free layer and the underlayer are removed.

In the magnetoresistive element according to the second embodiment of the present invention, the pinned direction of magnetization of the first magnetization pinned layer (first pinned layer) P1 and the pinned direction of magnetization of the second magnetization pinned layer (second pinned layer) P2 are substantially antiparallel to each other, and the magnetization of the first magnetization pinned layer (first pinned layer) P1 and the magnetization of the second magnetization pinned layer (second pinned layer) P2 are pinned by exchange coupling with one antiferromagnetic layer AF.

The pinned directions of magnetization of the first and second magnetization pinned layers can be defined as described above by, for example, designing the magnetoresistive film such that one of the first magnetization pinned layer and the second magnetization pinned layer is formed of a single ferromagnetic layer or is formed of a stack of an odd number of ferromagnetic layers and nonmagnetic layers (synthetic structure), and the other magnetization pinned layer is formed of a stack of an even number of ferromagnetic layers and nonmagnetic layers (synthetic structure).

Figure 9:
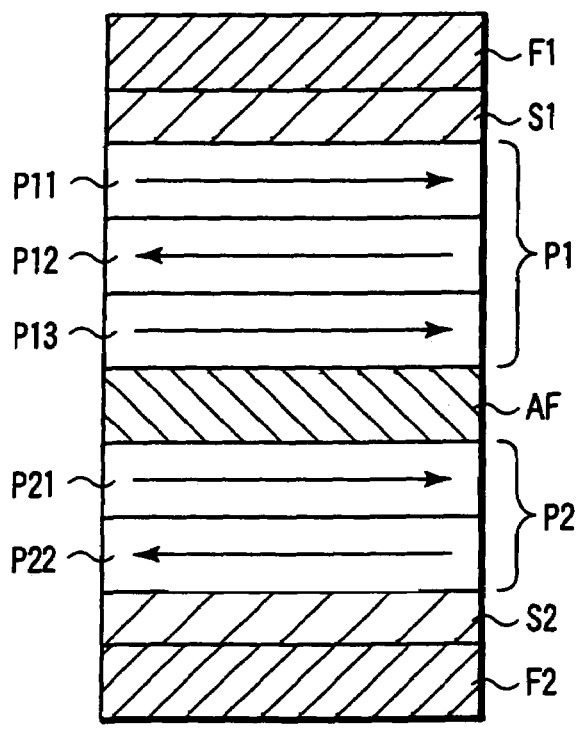
FIG. 9 schematically shows magnetization directions of the magnetization pinned layers included in a magnetoresistive element according to the second embodiment of the present invention.

FIG. 9 schematically shows the construction of the magnetoresistive element according to the second embodiment of the present invention, in which each of the first and second magnetization pinned layers has a synthetic structure. In the drawing, the first magnetization pinned layer P1 has a synthetic structure including three (odd number) ferromagnetic layers, and the second magnetization pinned layer P2 has a synthetic structure including two (even number) ferromagnetic layers. Incidentally, the nonmagnetic layer sandwiched between the two adjacent ferromagnetic layers constituting the magnetization pinned layer is omitted from the drawing for the sake of simplicity. Also, an arrow denotes the direction of magnetization of each of the ferromagnetic layers constituting the magnetization pinned layer.

To be more specific, the magnetoresistive element shown in FIG. 9 includes the second magnetization free layer (second free layer) F2, the second nonmagnetic intermediate layer (second spacer layer) S2, the second magnetization pinned layer (second pinned layer) P2 including two ferromagnetic layers P22 and P21, the antiferromagnetic layer AF, the first magnetization pinned layer (first pinned layer) P1 including three ferromagnetic layers P13, P12 and P11, the first nonmagnetic intermediate layer (first spacer layer) S1, and the first magnetization free layer (first free layer) F1, which are stacked one upon the other in the order mentioned.

By designing the first and second magnetization pinned layers P1 and P2 to have a stacked structure (synthetic structure) as shown in FIG. 9, it is possible to permit the directions of magnetization of the ferromagnetic layers positioned closest to the nonmagnetic intermediate layer (spacer layer) among the ferromagnetic layers constituting the two magnetization pinned layers P1 and P2 to be substantially antiparallel to each other by a single pinning heat treatment, i.e., by a pinning heat treatment in one direction. Thus, the pinned direction of magnetization of the ferromagnetic layer P11 is substantially antiparallel to the pinned direction of magnetization of the ferromagnetic layer P22.

In this case, the magnetization of the ferromagnetic layer P13 included in the first magnetization pinned layer P1 and the ferromagnetic layer P21 included in the second magnetization pinned layer P2 are pinned by exchange coupling with the same antiferromagnetic layer AF, with the result that the magnetization of the ferromagnetic layers P13 and P22 are pinned in substantially one direction (rightward in FIG. 9).

The magnetoresistive element according to the second embodiment of the present invention is operated by the operating principle similar to that shown in FIGS. 4 to 6 like the magnetoresistive element according to the first embodiment of the present invention. To be more specific, the operating principle can be explained by omitting the first pinned layer and the fourth pinned layer, and by substituting the second pinned layer and the third pinned layer for the first pinned layer and the second pinned layer, respectively, in FIGS. 4 to 6. Since differential detection is also performed in the magnetoresistive element according to the second embodiment of the present invention, it is possible to obtain an output waveform similar to that shown in FIG. 7.

The magnetoresistive element according to the second embodiment of the present invention includes only one antiferromagnetic layer and, thus, resistance of the element can be suppressed to a very small value so as to make it possible to improve MR ratio.

The materials and design of the magnetoresistive element according to the embodiments of the present invention will now be described in detail.

The magnetization free layer (free layer) will be described first. In the embodiments of the present invention, the first free layer and the second free layer permit independently changing the directions of magnetization in the air-bearing surface relative to the external magnetic field generated from the perpendicular magnetic recording medium. It is possible to use Co (cobalt), Fe (iron), Ni (nickel) or an alloy containing these elements for forming these free layers. To be more specific, the materials used for forming the free layers include, for example, a $Co_{90}Fe_{10}$ (at %) alloy, a CoFeNi alloy, and a $Ni_{80}Fe_{20}$ alloy (permalloy). The actual construction of the free layer includes, for example, a CoFe/NiFe stacked film, a (CoFe/Cu)$_n$/CoFe stacked film (n being an integer of 1 or more), and a (FeCo/Cu)$_n$/FeCo stacked film (n being an integer of 1 or more).

In the embodiments of the present invention, it is desirable to apply anisotropy control and magnetic domain control, which are collectively called bias control, to the first free layer and the second free layer by applying a magnetic bias in the track width direction of the free layers using a hard magnetic film, which is called a hard bias film, or an antiferromagnetic film, which is called a patterned bias film. The hard bias film is formed on the both end portions of the free layers in the track width direction on the air-bearing surface. The patterned bias film is formed on the both end portions of the free layers in the track width direction on the air-bearing surface and is patterned by photolithography and etching.

The other magnetic biasing methods include, for example, stack biasing (in-stack bias film) and long-distance exchange-coupling biasing. In the case of the stack biasing, a stacked structure of a free layer/a spacer layer (stacked film of, for example, Cu, Ru, Ta and Ti to disrupt interlayer exchange coupling)/a biasing ferromagnetic layer/an antiferromagnetic layer, or a free layer/a spacer layer/a biasing hard magnetic layer (e.g., a CoPt-based alloy layer or a CoCr-based alloy layer) is formed. In the case of the long-distance exchange-coupling biasing, a stacked structure of a free layer/a spacer layer (e.g., a very thin film of Cu having a thickness of 2 nm or less)/an antiferromagnetic layer is formed.

The magnetization pinned layer (pinned layer) and the antiferromagnetic layer will now be described. The magnetization of each of the first to fourth magnetization pinned layers (pinned layers) is pinned in one direction by exchange coupling with the antiferromagnetic layer. The antiferromagnetic layer is formed of an Mn (manganese)-based alloy containing, for example, Pt (platinum), Ir (iridium), Rh (rhodium), Ru (ruthenium) or Pd (palladium). To be more specific, the materials used for forming the antiferromagnetic layer include, for example, a PtMn alloy, a PtPdMn alloy, and an IrMn alloy.

A CoFe-based alloy or a NiFe-based alloy is widely used for forming the ferromagnetic layer included in each of the first to fourth magnetization pinned layers, and Ru or Ir is widely used for forming the nonmagnetic layer. As for the actual layer construction, a stacked structure of CoFe/Ru/CoFe is widely used in the case of the stack including an even number of ferromagnetic layers, and a stacked structure of CoFe/Ru/CoFe/Ru/CoFe is widely used in the case of the stack including an odd number of ferromagnetic layers. Also, for improving the MR ratio, it is desirable to use for the pinned layer a stacked film such as CoFe/Cu prepared by stacking a very thin nonmagnetic Cu layer and a ferromagnetic CoFe layer or a stacked film of different kinds of ferromagnetic layers such as CoFe/NiFe or CoFe/FeCo.

The nonmagnetic intermediate layer will now be described. In the case of a general metal-based CPP-GMR film, a metal Cu film having a thickness of 1 to 10 nm is used as each of the first to fourth nonmagnetic intermediate layers included in the magnetoresistive element. Also, in the case of using a TMR (tunneling magnetoresistive) film, an insulating film acting as a tunnel barrier film made of an oxide film such as $Al_2O_3$, a nitride film such as AlN, or an oxynitride film is used as each of the first to fourth nonmagnetic intermediate layers. Further, where a current confinement effect is desired in the nonmagnetic intermediate layer, an oxide such as Al—Cu—O or Cr—Cu—O is used. It is possible to use the oxide layer in a thickness of about 0.5 nm to 5 nm. In this case, the oxide layer is used in the form of a stacked structure including metal layers such as a Cu and Au layer and an oxide layer sandwiched between the metal layers, for example, a stack of Cu(Au)/oxide/Cu(Au).

The magnetic gap formed in the magnetoresistive element according to the embodiments of the present invention will now be described. The distance between the two free layers, which corresponds to the substantial gap length, is determined in accordance with the linear recording density of the magnetic recording/reproducing system to which the magnetoresistive element of the present invention is applied. Also, it is desirable for the thickness of each of the two free layers to be determined in accordance with the distribution of the signal magnetic field from the recording bits. In order to ensure the detection resolution relative to the signal magnetic field from the individual recording bits and to achieve smooth introduction of the magnetic flux, it is desirable for the thickness of each of the two free layers to be smaller than the distance between the two free layers.

On the other hand, taking into consideration of the characteristics as a magnetic circuit, it is desirable for the distance between the two adjacent free layers to fall within a range of between 1 nm and 50 nm in order to ensure the magnetic flux efficiency. Where the distance noted above is smaller than 1 nm, interlayer exchange coupling and magnetostatic coupling are exerted between the two free layers so as to lower the sensitivity. Where the distance in question is larger than 50 nm, a magnetic circuit is not formed between the two free layers. It is more desirable for the distance between the two adjacent free layers to fall within a range of between 10 nm and 20 nm.

A stacked structure of a spacer layer/a pinned layer/an antiferromagnetic layer/a pinned layer/a spacer layer is formed within the small gap noted above. In this case, an antiferromagnetic layer such as an IrMn alloy, which permits a sufficiently thin film, may be used.

Further, shields in the magnetic head according to the embodiments of the present invention will now be described. In the magnetic head according to the embodiments of the present invention, the resolution in the direction of the linear recording density is determined by the distance between the two free layers so as to define the substantial magnetic gap, as described previously. Therefore, it is unnecessary to arrange a pair of magnetic shields for defining the magnetic gap as in the conventional shield type magnetic head.

It should be noted, however, that, even in the embodiments of the present invention, it is possible to obtain an effect of suppressing disturbance caused by, for example, an external magnetic field by arranging a pair of magnetic shields. Such being the situation, it is also possible to arrange magnetic shields in the present invention. To be more specific, it is possible to diminish $PW_{50}$ of the reproduction output (i.e., a full-width at half maximum of the reproduction pulsed waveform shown in FIG. 7) by arranging magnetic shields in the magnetic head according to the embodiments of the present invention.

It is possible to use, for example, NiFe (permalloy) as a material of the magnetic shield. Where an insulating layer is formed between the magnetic shield and the magnetoresistive film and an electrode is buried in the insulating layer, it is possible to use, for example, $Al_2O_3$ (alumina) or $SiO_2$ as a material of the insulating layer.

Figure 10:
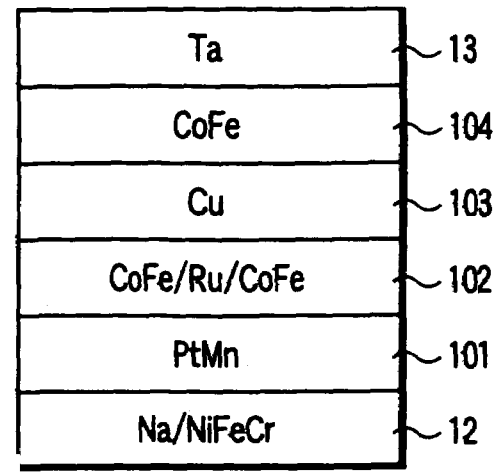
FIG. 10 schematically shows a construction of a conventional shield type single SV head.
Figure 11:
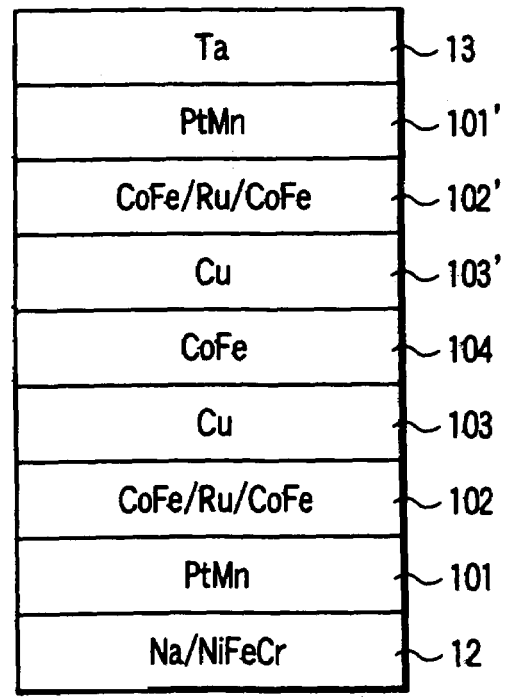
FIG. 11 schematically shows a construction of a conventional shield type dual SV head.
Figure 12:
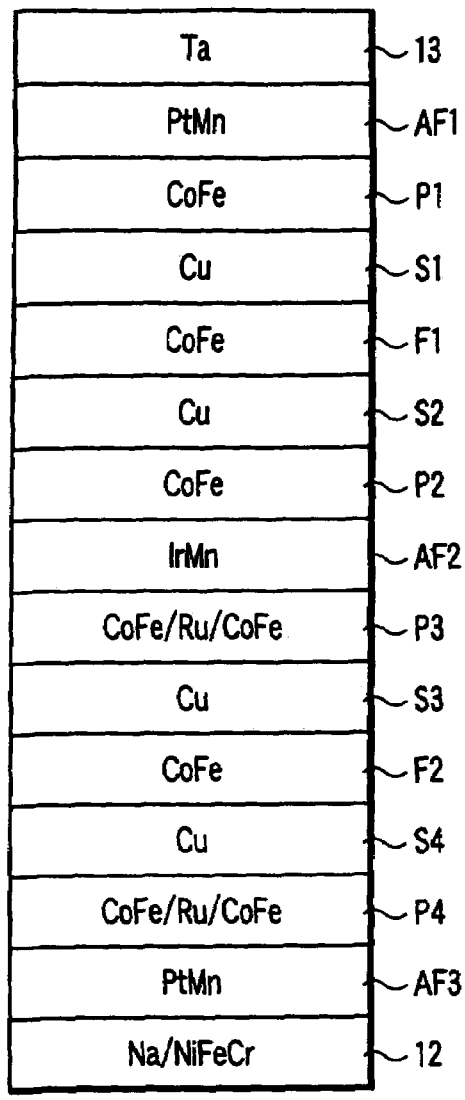
FIG. 12 schematically shows a construction of the magnetoresistive element according to Embodiment 1 of the present invention.
Figure 13:
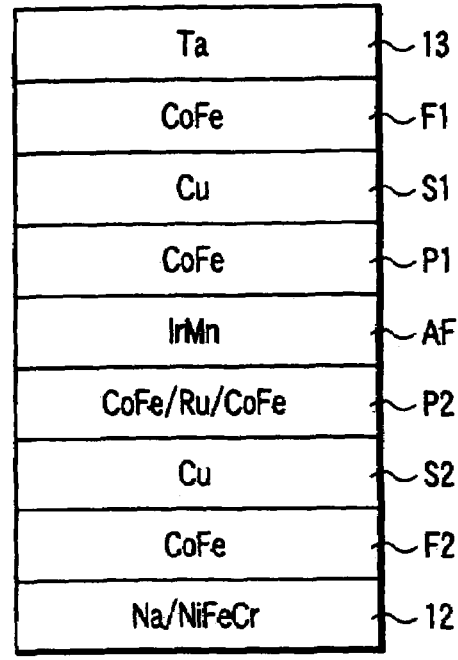
FIG. 13 schematically shows a construction of the magnetoresistive element according to Embodiment 2 of the present invention.
Figure 16:
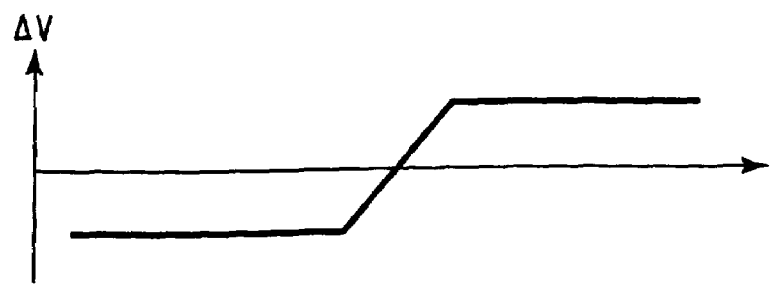
FIG. 16 shows a waveform of an output obtained by a conventional shield type single SV head.

Next, micromagnetics simulation was performed in respect of the conventional magnetic head and the magnetic head of the present invention. FIGS. 10 to 13 show the CPP-SV film structures in the magnetic heads used for the simulation. FIG. 10 shows the conventional shield type single spin-valve (single SV) head. FIG. 11 shows the conventional shield type dual spin-valve (dual SV) head. FIG. 12 shows the magnetoresistive head for embodiment 1 of the present invention. FIG. 13 shows the magnetoresistive head for embodiment 2 of the present invention. In the model film shown in each of FIGS. 12 and 13, an IrMn film was used as the antiferromagnetic film (AF2 or AF) in the central portion. The thickness of the Cu spacer layer was set at 2 nm, and the thickness of the $Co_{90}Fe_{10}$ pinned layer was set at 3 nm. Table 1 shows the results of calculations.

TABLE 1

|  | Conventional shield-type single SV | Conventional shield-type dual SV | Embodiment 1 of the present invention | Embodiment 2 of the present invention |
|---|---|---|---|---|
| MR ratio (%) | 2.0 | 3.1 | 2.7 | 2.2 |
| Normalized MR ratio | 1 (reference) | 1.5 | 1.3 | 1.1 |
| Normalized flux efficiency | 1 (reference) | 1 | 1.3 | 1.3 |
| Normalized output (normalized flux efficiency × normalized MR ratio) | 1 | 1.5 | 1.7 | 1.4 |

The MR ratio is not sufficient in the conventional shield type single SV head. The MR ratio is certainly large in the conventional shield type dual SV head. It should be noted, however, that it is difficult to form a CPP-SV film between the shields in the case where the gap is made extremely small, resulting in failure to cope with a high linear recording density.

On the other hand, the magnetoresistive heads according to the embodiments of the present invention have been found to exhibit a higher efficiency than the conventional magnetic heads and to permit an improved MR ratio compared with the single SV head. Also, the magnetic gap is about 19 nm so as to obtain satisfactory resolution.

To be more specific, the magnetoresistive head for embodiment 1 of the present invention has been found to exhibit the MR ratio of about 1.3 times as high as that of the single SV head. Also, the magnetoresistive head for embodiment 1 of the present invention has been found to be superior to the dual SV head in the resultant head output.

The magnetoresistive head for embodiment 2 of the present invention has also been found to exhibit high output of about 1.4 times as high as that of the conventional single SV head.

As described above, it has been found that very high output can be expected from the magnetoresistive element and the magnetic head for the embodiments of the present invention, and that these magnetoresistive element and magnetic head are highly adapted for ultra-high recording density and ultra-high linear recording density in the future.

The magnetoresistive element for the embodiments of the present invention can be mounted to a magnetic recording/reproducing apparatus. The particular magnetic recording/reproducing apparatus will now be described. The magnetoresistive element or the magnetic head for the embodiments of the present invention can be incorporated in an integrated recording/reproducing magnetic head assembly so as to be mounted to a magnetic recording/reproducing apparatus.

Figures 14, 15:
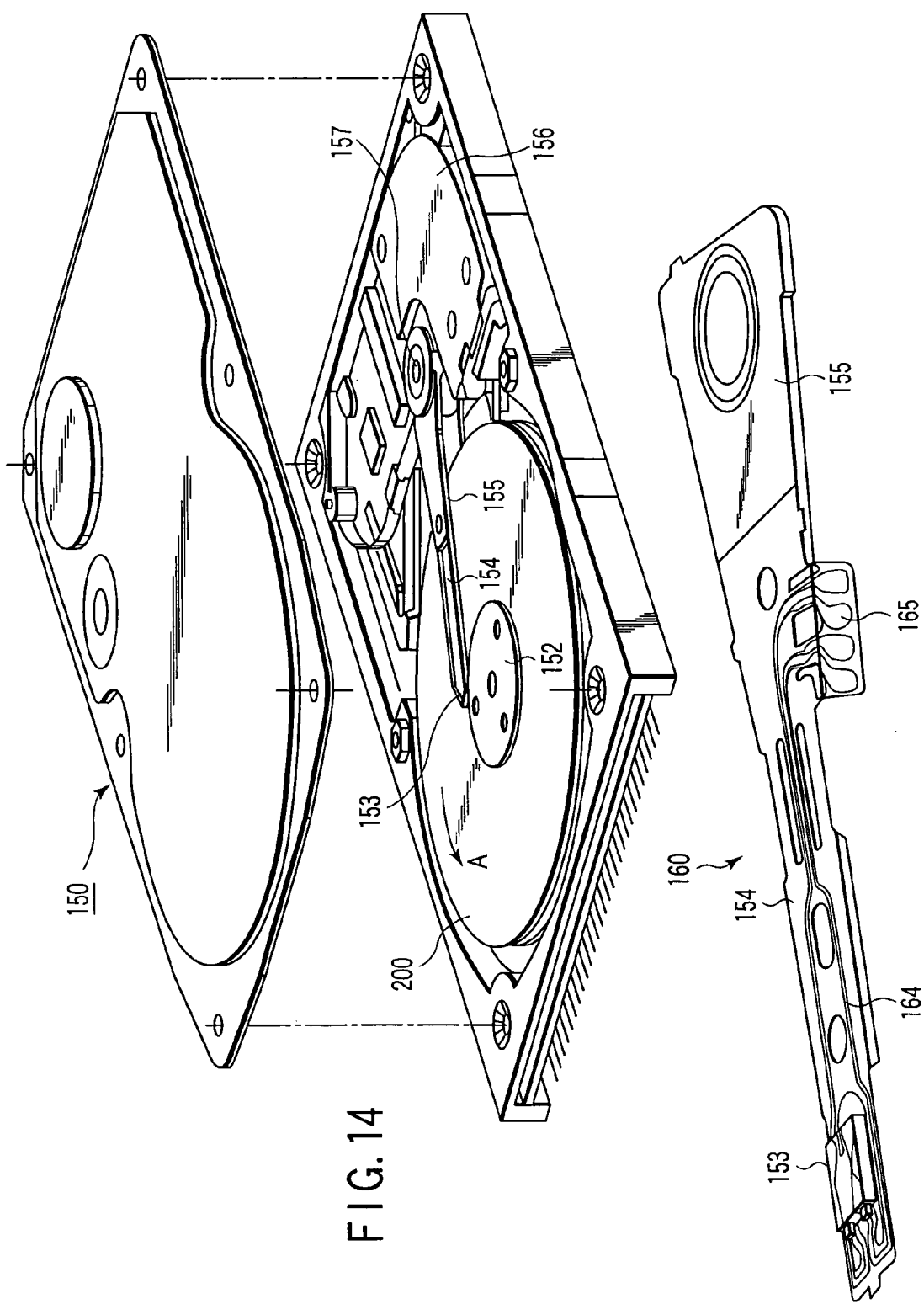
FIG. 14 is a perspective view schematically showing a construction of a magnetic recording/reproducing apparatus according to another embodiment of the present invention.
FIG. 15 is a perspective view showing the magnetic head assembly used in the magnetic recording/reproducing apparatus shown in FIG. 14 as viewed from the disk.

FIG. 14 is a perspective view schematically exemplifying the construction of the particular magnetic recording/reproducing apparatus. The magnetic recording/reproducing apparatus 150 is an apparatus of the type that a rotary actuator is used. As shown in the drawing, the magnetic disk 200 for perpendicular magnetic recording is mounted to the spindle 152 and is rotated in the direction denoted by an arrow A by a motor (not shown) in response to control signals generated from a drive controller (not shown). The magnetic recording/reproducing apparatus 150 may be provided with a plurality of magnetic disks 200.

The head slider 153 performing recording and reproduction of information stored in the magnetic disk 200 is mounted to the tip of the suspension 154. The magnetoresistive element or the magnetic head for any of the embodiments described above is mounted to the tip of the head slider 153.

When the magnetic disk 200 is rotated, air-bearing surface (ABS) of the head slider 153 is held floating by a prescribed height from the surface of the magnetic disk 200. Alternatively, it is also possible to employ a so-called "contact type" slider that is brought into contact with the magnetic disk 200.

The suspension 154 is connected to one end of the actuator arm 155. A bobbin portion for holding a driving coil (not shown) is formed in the other end of the actuator arm 155. Also, the voice coil motor 156, which is a kind of a linear motor, is mounted to a region in the vicinity of the other end of the actuator arm 155. The voice coil motor 156 is constituted by a magnetic circuit comprising a driving coil (not shown) wound in the bobbin portion of the actuator arm 155, and a permanent magnet and a counter yoke arranged to interpose the driving coil between them.

The actuator arm 155 is held by ball bearings (not shown) arranged in upper and lower portions of the pivot 157 and can be pivotally rotated by the voice coil motor 156.

FIG. 15 is a perspective view of the magnetic head assembly 160 including the actuator arm 155 as viewed from the disk. As shown in the drawing, the magnetic head assembly 160 comprises the actuator arm 155 having a bobbin portion for holding a driving coil. The suspension 154 is connected to one end of the actuator arm 155. The head slider 153 provided with a magnetoresistive element or a magnetic head according to the embodiments of the present invention is mounted to the tip of the suspension 154. Lead wires 164 for writing and reading signals, which are wired on the suspension 154, are electrically connected to respective electrodes of the magnetic head mounted to the head slider 153. The reference numeral 165 shown in the drawing denotes an electrode pad in the magnetic head assembly 160. As described above, a magnetoresistive element or a magnetic head for the embodiments of the present invention is included in the magnetic recording/reproducing apparatus. It follows that the magnetic recording/reproducing apparatus of the present invention permits readout of the information magnetically recorded in the perpendicular magnetic recording disk 200 at higher recording density than that of the prior art.

The present invention is not limited to the embodiments described above. For example, the various modifications fall within the scope of the present invention as long as those skilled in the art can implement the present invention by suitably selecting the specific sizes and materials of the components of the magnetoresistive element as well as the shapes and materials of the electrode, the biasing film, and the insulating film from the known ranges so as to obtain the similar effects.

Also, it is possible to form the components of the magnetoresistive element such as the antiferromagnetic layer, the pinned layer, the spacer layer, and the free layer as a single layer or a stacked structure including at least two layers.

Also, an integrated recording/reproducing magnetic head can be obtained by arranging a writing head adjacent to read head of the magnetoresistive element of the present invention.

Further, it is possible for the magnetic recording/reproducing apparatus of the present invention to be a so-called fixed disk type, which includes a fixed perpendicular magnetic recording medium, or to be a so-called "removable type" that permits replacement of a recording medium.

Still further, all the magnetoresistive elements, the magnetic heads and the magnetic recording/reproducing apparatuses, which can be achieved by those skilled in the art by altering appropriately the designs based on the magnetic head and the magnetoresistive element described above as the embodiments of the present invention, are also included in the scope of the present invention.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetoresistive element, comprising:
   a magnetoresistive film; and
   a pair of electrodes electrically connected to upper and lower surfaces of the magnetoresistive film, respectively, so as to flow a sense current in a direction substantially perpendicular to a plane of the magnetoresistive film,
   in which the magnetoresistive film comprises:
   a first magnetization free layer of a ferromagnetic film whose magnetization direction is changed in response to the external magnetic field,
   a second magnetization free layer of a ferromagnetic film whose magnetization direction is changed in response to the external magnetic field,
   a first magnetization pinned layer of a ferromagnetic film whose magnetization direction is substantially pinned in one direction,
   a second magnetization pinned layer of a ferromagnetic film whose magnetization direction is substantially pinned in one direction,
   a first nonmagnetic intermediate layer formed between the first magnetization free layer and the first magnetization pinned layer, and
   a second nonmagnetic intermediate layer formed between the second magnetization free layer and the second magnetization pinned layer,
   the first magnetization pinned layer and the second magnetization pinned layer being formed between the first nonmagnetic intermediate layer and the second nonmagnetic intermediate layer;
   the pinned direction of magnetization of a ferromagnetic layer included in the first magnetization pinned layer which is in contact with the first nonmagnetic intermediate layer being substantially antiparallel to the pinned direction of magnetization of a ferromagnetic layer included in the second magnetization pinned layer which is in contact with the second nonmagnetic intermediate layer, and the magnetization of each of the first magnetization pinned layer and the second magnetization pinned layer being pinned by exchange coupling with one antiferromagnetic layer.

2. The magnetoresistive element according to claim 1, wherein one of the first magnetization pinned layer and the second magnetization pinned layer is formed of a single ferromagnetic layer or is formed of a stack of an odd number of ferromagnetic layers and nonmagnetic layers, and the other magnetization pinned layer is formed of a stack of an even number of ferromagnetic layers and nonmagnetic layers.

3. The magnetoresistive element according to claim 1, wherein the pair of electrodes electrically connected to upper and lower surfaces of the magnetoresistive film, respectively, provides a differential output.

4. The magnetoresistive element according to claim 1, wherein a gap between the first and second magnetization free layers ranges from 1 nm to 50 nm.

5. The magnetoresistive element according to claim 1, wherein at least one layer of the first and second nonmagnetic intermediate layers contains an oxide.

6. The magnetoresistive element according to claim 5, wherein the nonmagnetic intermediate layer containing the oxide has a thickness ranging from 0.5 nm to 5 nm.

7. A magnetic head comprising the magnetoresistive element according to claim 1.

8. A magnetic recording/reproducing apparatus, comprising:
   the magnetic head according to claim 7; and
   a perpendicular magnetic recording medium.

9. A magnetoresistive element, comprising:
   a magnetoresistive film; and
   a pair of electrodes electrically connected to upper and lower surfaces of the magnetoresistive film, respectively, so as to flow a sense current in a direction substantially perpendicular to a plane of the magnetoresistive film,
   in which the magnetoresistive film comprises:
   a first magnetization free layer of a ferromagnetic film whose magnetization direction is changed in response to the external magnetic field,
   a second magnetization free layer of a ferromagnetic film whose magnetization direction is changed in response to the external magnetic field,
   a first magnetization pinned layer of a ferromagnetic film whose magnetization direction is substantially pinned in one direction,
   a second magnetization pinned layer of a ferromagnetic film whose magnetization direction is substantially pinned in one direction,
   a third magnetization pinned layer of a ferromagnetic film whose magnetization direction is substantially pinned in one direction,
   a fourth magnetization pinned layer of a ferromagnetic film whose magnetization direction is substantially pinned in one direction,
   a first nonmagnetic intermediate layer formed between the first magnetization free layer and the first magnetization pinned layer,
   a second nonmagnetic intermediate layer formed between the first magnetization free layer and the second magnetization pinned layer, a third nonmagnetic intermediate layer formed between the second magnetization free layer and the third magnetization pinned layer, and a fourth nonmagnetic intermediate layer formed between the second magnetization free layer and the fourth magnetization pinned layer, the second magnetization pinned layer and the third magnetization pinned layer being formed between the second nonmagnetic intermediate layer and the third nonmagnetic intermediate layer;

the pinned direction of magnetization of the first magnetization pinned layer is substantially parallel to the pinned direction of magnetization of the second magnetization pinned layer, the pinned direction of magnetization of the third magnetization pinned layer is substantially parallel to the pinned direction of magnetization of the fourth magnetization pinned layer, and the pinned direction of magnetization of the second magnetization pinned layer is substantially antiparallel to the pinned direction of magnetization of the third magnetization pinned layer.

10. The magnetoresistive element according to claim 9, wherein, when the magnetization pinned layers are classified into two sets consisting of a first set of the first magnetization pinned layer and the second magnetization pinned layer and a second set of the third magnetization pinned layer and the fourth magnetization pinned layer, each of the magnetization pinned layers for one set is formed of a single ferromagnetic layer or is formed of a stack of an odd number of ferromagnetic layers and nonmagnetic layers, and each of the magnetization pinned layers for the other set is formed of a stack of an even number of ferromagnetic layers and nonmagnetic layers.

11. The magnetoresistive element according to claim 9, wherein, the magnetization of the first magnetization pinned layer is pinned by exchange coupling with a first ferromagnetic layer;

the magnetization of each of the second magnetization pinned layer and the third magnetization pinned layer is pinned by exchange coupling with a second antiferromagnetic layer; and the magnetization of the fourth magnetization pinned layer is pinned by exchange coupling with a third antiferromagnetic layer.

12. The magnetoresistive element according to claim 9, wherein the pair of electrodes electrically connected to upper and lower surfaces of the magnetoresistive film, respectively, provides a differential output.

13. The magnetoresistive element according to claim 9, wherein a gap between the first and second magnetization free layers ranges from 1 nm to 50 nm.

14. The magnetoresistive element according to claim 9, wherein at least one layer of the first to fourth nonmagnetic intermediate layers contains an oxide.

15. The magnetoresistive element according to claim 14, wherein the nonmagnetic intermediate layer containing the oxide has a thickness ranging from 0.5 nm to 5 nm.

16. A magnetic head comprising the magnetoresistive element according to claim 9.

17. A magnetic recording/reproducing apparatus, comprising:

the magnetic head according to claim 16, and a perpendicular magnetic recording medium.

* * * * *